US008630198B1

(12) United States Patent
Vijayaraghavan et al.

(10) Patent No.: US 8,630,198 B1
(45) Date of Patent: Jan. 14, 2014

(54) APPARATUS AND METHODS OF DYNAMIC TRANSMIT EQUALIZATION

(75) Inventors: Divya Vijayaraghavan, Mountain View, CA (US); Gopi Krishnamurthy, Tracy, CA (US); Ning Xue, San Jose, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 292 days.

(21) Appl. No.: 12/983,180

(22) Filed: Dec. 31, 2010

(51) Int. Cl.
*G01R 31/08* (2006.01)

(52) U.S. Cl.
USPC ........................................ 370/252

(58) Field of Classification Search
None
See application file for complete search history.

(56) References Cited

U.S. PATENT DOCUMENTS

| 7,793,030 | B2 | 9/2010 | Jenkins et al. | |
|---|---|---|---|---|
| 2006/0067387 | A1* | 3/2006 | Ahmed et al. | 375/219 |
| 2006/0090014 | A1* | 4/2006 | Wong et al. | 710/10 |
| 2007/0147491 | A1* | 6/2007 | Casper et al. | 375/232 |
| 2008/0285453 | A1* | 11/2008 | Connolly et al. | 370/235 |
| 2010/0329325 | A1* | 12/2010 | Mobin et al. | 375/232 |
| 2012/0033619 | A1* | 2/2012 | Corral | 370/329 |

OTHER PUBLICATIONS

Title: PHY interface for the PCI express 3.0 Rev .9, Date: Sep. 2010, Publisher: Intel Corporation.*
Title: Low cost FPGA solution for PCI express implementation, Date: Mar. 2006, Publisher: Altera.*
Title: PHY interface for the PCI express 3.0 Rev .5, Date: Aug. 2008, Publisher: Intel Corporation.*
Altera White Paper "Low-Cost FPGA Solution for PCI Express Implementation", Mar. 2006, pp. 1-5, Altera Corporation, San Jose, CA.
PHY Interface for the PCI Express Architecture, PCI Express 3.0, Aug. 2008, pp. 1-45, 2007-2008, Intel Corporation—All rights reserved.
Dan Froelich, PCI Express 3.0 Technology: Electrical Requirements for Designing ASICs on Intel Platforms, IDF2009 (Intel Developer Forum), pp. 1-33, Intel Corporation.
PHY Interface for the PCI Express Architecture (PIPE) for SATA 3.0 Revision.7, 2010 Intel Corporation, pp. 1-30.

* cited by examiner

*Primary Examiner* — Chirag Shah
*Assistant Examiner* — Rina Pancholi
(74) *Attorney, Agent, or Firm* — Okamoto & Benedicto LLP

(57) ABSTRACT

One embodiment relates to an integrated circuit configured to perform dynamic transmit equalization of a bi-directional lane. The integrated circuit including an interface between the physical coding and media access control circuitry, and an equalization control circuit which is external to the physical coding circuitry and which is configured to perform the dynamic transmit equalization using said interface. Another embodiment relates to a transceiver circuit which includes physical coding circuitry and media access control circuitry. The transceiver circuit further includes an interface between the physical coding circuitry and the media access control circuitry and an equalization controller which is external to the physical coding circuitry and which is configured to perform dynamic transmit equalization using said interface. The interface is configured to provide transmit coefficient data in a time-multiplexed signal format from the media access control circuitry to the physical coding circuitry. Other embodiments, aspects, and features are also disclosed.

24 Claims, 9 Drawing Sheets

FIG. 3 (Phase 0)

(Phase 1)

(Phase 2)

(Phase 3)

APPARATUS AND METHODS OF DYNAMIC TRANSMIT EQUALIZATION

BACKGROUND

1. Technical Field

The present invention relates generally to transceivers and integrated circuits. More particularly, the present invention relates to apparatus and methods of dynamic transmit equalization which may be applied to transceivers in integrated circuits.

2. Description of the Background Art

As the signaling speeds used for communications between integrated circuits continue to increase, signal degradation during transmission becomes increasingly problematic. The signal degradation may cause inter-symbol interference and crosstalk which result in unwanted transmission errors and losses. Equalization may be employed to compensate for the signal degradation and to reduce the error rate to within specified limits.

SUMMARY

It is desirable to improve the operation of embedded transceivers in integrated circuits. More particularly, it is desirable to improve apparatus and methods of equalization used by embedded transceivers.

One embodiment relates to an integrated circuit. The integrated circuit includes an interface between the physical coding and media access control circuitry, and an equalization control circuit which is external to the physical coding circuitry and which is operable to perform the dynamic transmit equalization using said interface.

Another embodiment relates to a method of dynamic transmit equalization performed at an upstream component. Preset data for equalization is applied in the upstream component, and preset data for equalization is transmitted to a downstream component for application therein. Receiver and transmitter coefficients at the upstream component are refined.

Another embodiment relates to a method of dynamic transmit equalization performed at a downstream component. Preset data for equalization is applied in the downstream component, and preset data for equalization is transmitted to an upstream component for application therein. Receiver and transmitter coefficients at the downstream component are refined.

Another embodiment relates to a transceiver circuit which includes physical coding circuitry and media access control circuitry. The transceiver circuit further includes an interface between the physical coding circuitry and the media access control circuitry and an equalization controller which is external to the physical coding circuitry and which is configured to perform dynamic transmit equalization using said interface. The interface is configured to provide transmit coefficient data in a time-multiplexed signal format from the media access control circuitry to the physical coding circuitry.

Other embodiments, aspects, and features are also disclosed.

DETAILED DESCRIPTION

As the next generation of serial protocols are developed to address data rates of 8 gigabits per second (Gbps) and higher per channel, achieving an optimal eye opening at the remote device's receiver becomes quite challenging. As such, rather than using constant equalization settings, it may be necessary to dynamically adjust the transceiver's transmit equalization settings based on a bit error rate (BER) determination by the remote receiver.

The present application discloses a circuit architecture for dynamic transmit equalization. In particular, the circuit architecture included dynamic transmit equalization control circuitry that resides in the physical layer and media access control layer (PhyMAC) circuitry and is independent from the physical coding sublayer (PCS) circuitry. A PCS-to-PhyMAC interface is structured with minimal signaling added per channel by using time-division multiplexing. This architecture advantageously reduces the area required in the PCS circuitry.

Figure 1:
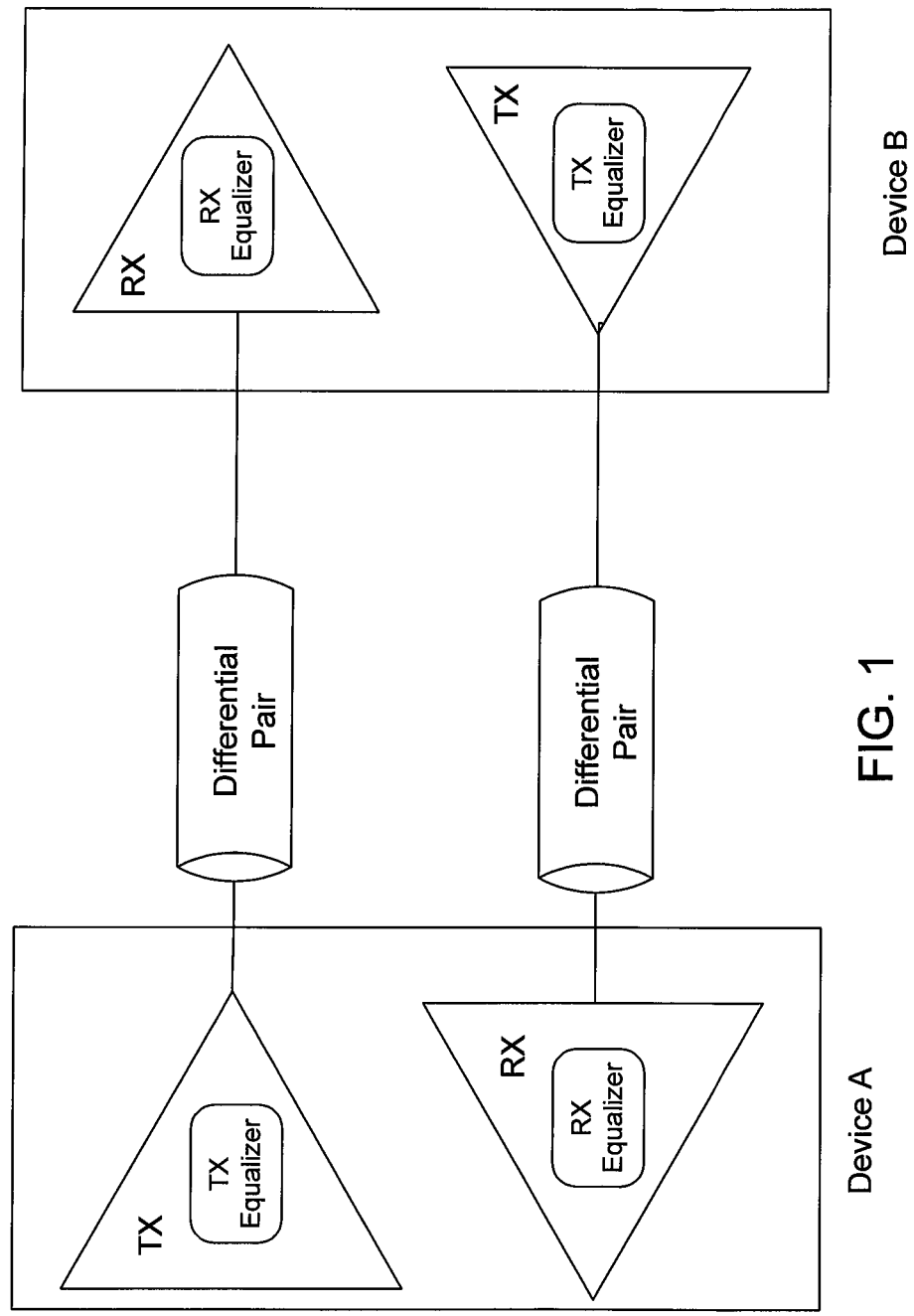
FIG. 1 depicts a bi-directional lane which is configured to communicate data between two communication devices in accordance with one embodiment.

FIG. 1 depicts a bi-directional lane which is configured to communicate data between two communication devices (Devices A and B) in accordance with one embodiment. The lane may use two pairs of differential lines to communicate data in both directions at the same time (i.e. to operate in full duplex). As shown in FIG. 1, each device includes a transmitter (TX) circuit and a receiver (RX) circuit. Two differential pairs (of wires) may be used to connect the two devices. For example, a first differential pair may connect the TX circuit of Device A to the RX circuit of Device B, and a second differential pair may connect the TX circuit of Device B to the RX circuit of Device A.

Each TX circuit may be configured to obtain data to be transmitted, scramble the data, encode the data, convert the data from parallel data to serial data, and transmit a differential signal carrying the serial data. For example, the encoding may comprise 8 bit-to-10 bit encoding or 128 bit-to-130 bit encoding.

Within each TX circuit, the TX equalizer circuitry may be configured to compensate for channel loss. For example, the TX equalizer circuitry may perform pre-emphasis by amplifying some (usually higher) frequency content in the signal to improve the signal-to-noise ratio at those frequencies. Each differential pair (of wires) comprises a lossy communication channel in that there is a loss in signal quality as a result of transmission over the differential pair. For example, higher frequency signal components may be attenuated during the transmission.

Within the RX circuit, the RX equalizer circuitry may be configured to compensate for channel loss. For example, the RX equalizer circuitry may perform de-emphasis by attenuating some (usually higher) frequency content in the signal to remove distortion previously introduced by the pre-emphasis.

The RX circuit may also be configured to receive the differential signal, recover the clock and data signals from the received signal, convert the data from serial to parallel, decode the data, unscramble the data, and then output the data. For example, the decoding may comprise 10 bit-to-8 bit decoding or 130 bit-to-128 bit decoding.

Note that a data bus may be configured to use one or more lanes. For example, if two lanes are used by a bus, then the bus may be referred to as an x2 bus. More generally, if M lanes are used by a bus, then the bus may be referred to as an xM bus.

Figure 2:
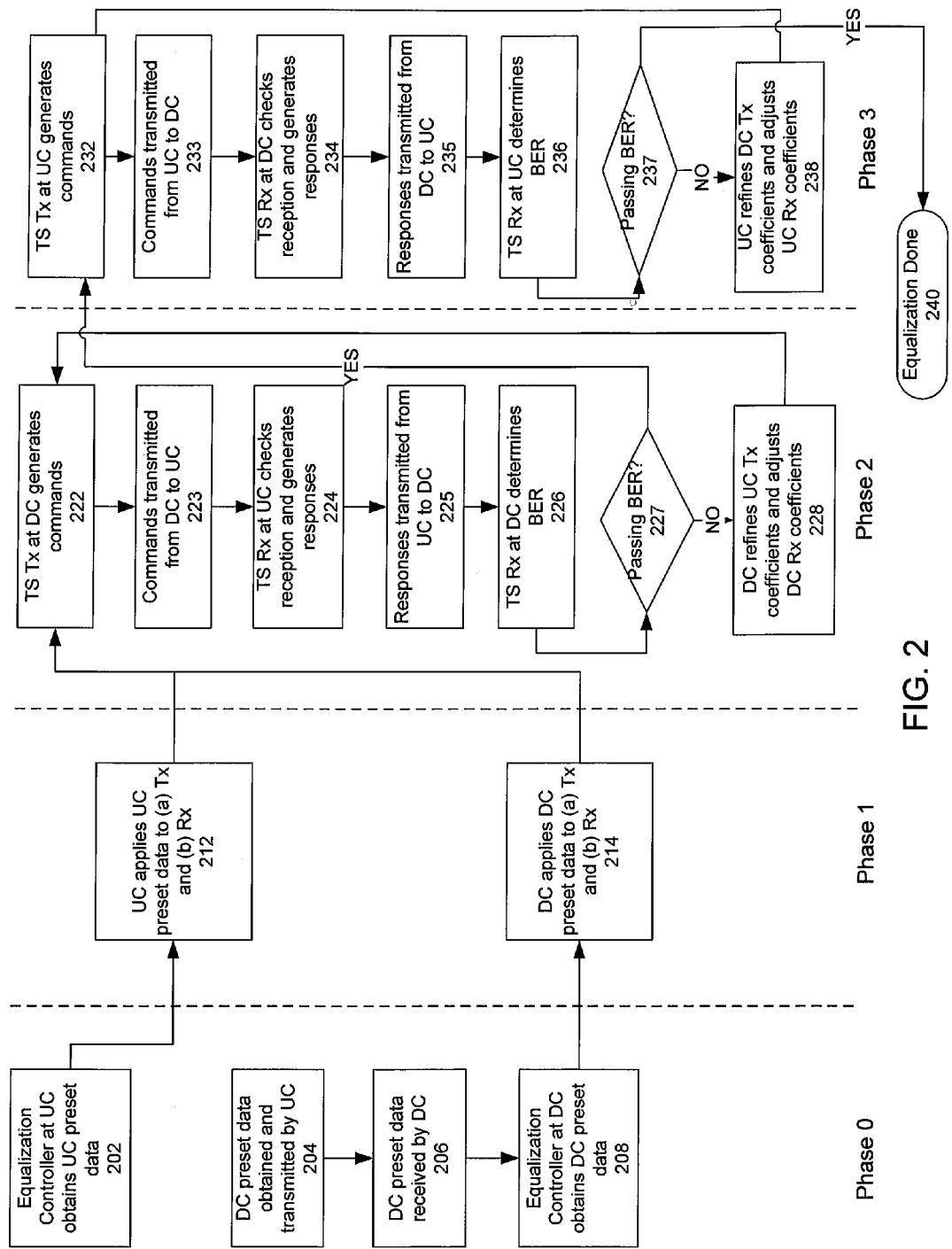
FIG. 2 is an exemplary flow chart showing a method of dynamic transmit equalization in accordance with an embodiment of the invention.
Figure 3:
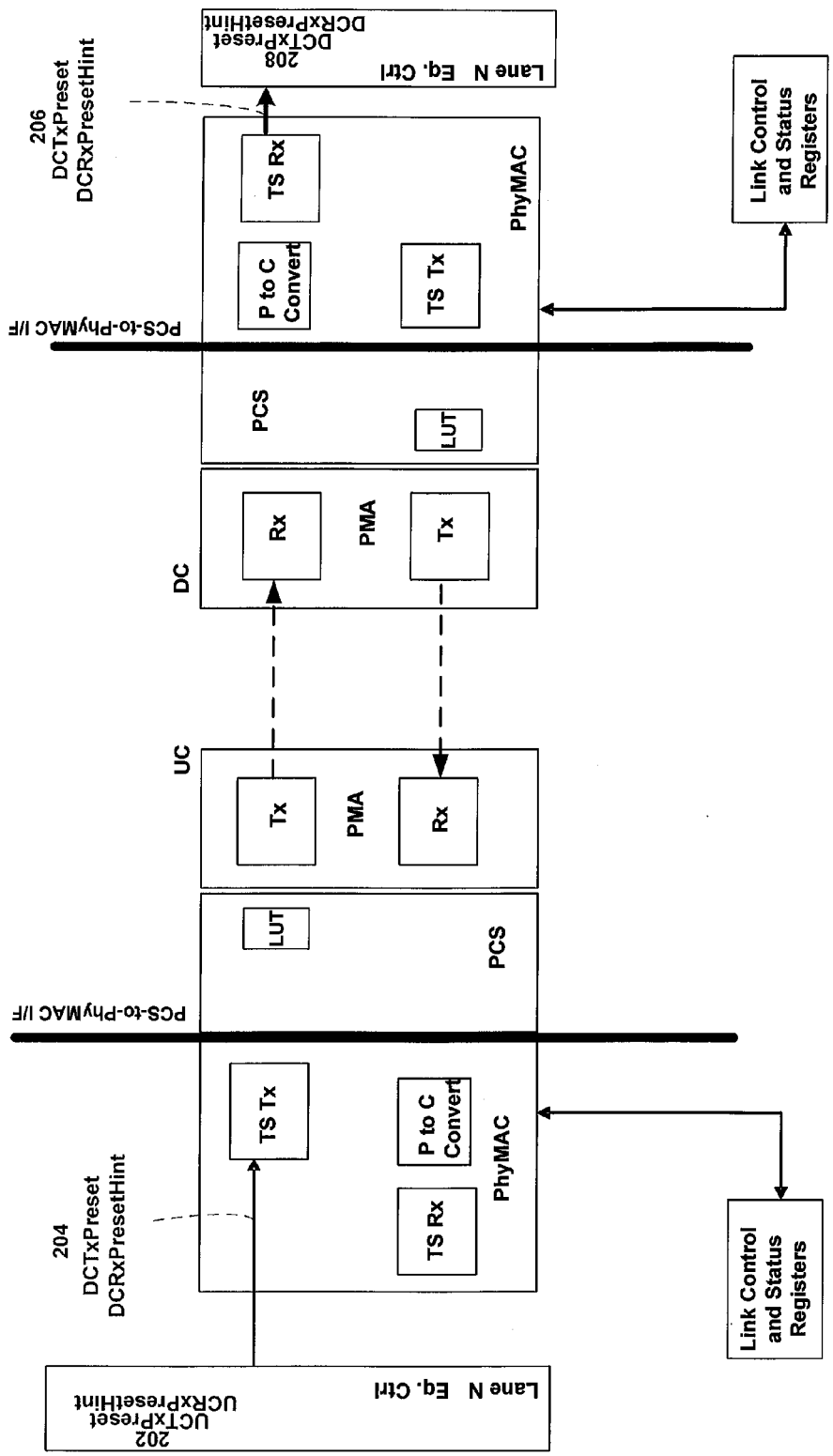
FIG. 3 is a schematic diagram depicting components of two communication devices and operations performed to distribute preset equalization settings in accordance with an embodiment of the invention.
Figure 4:
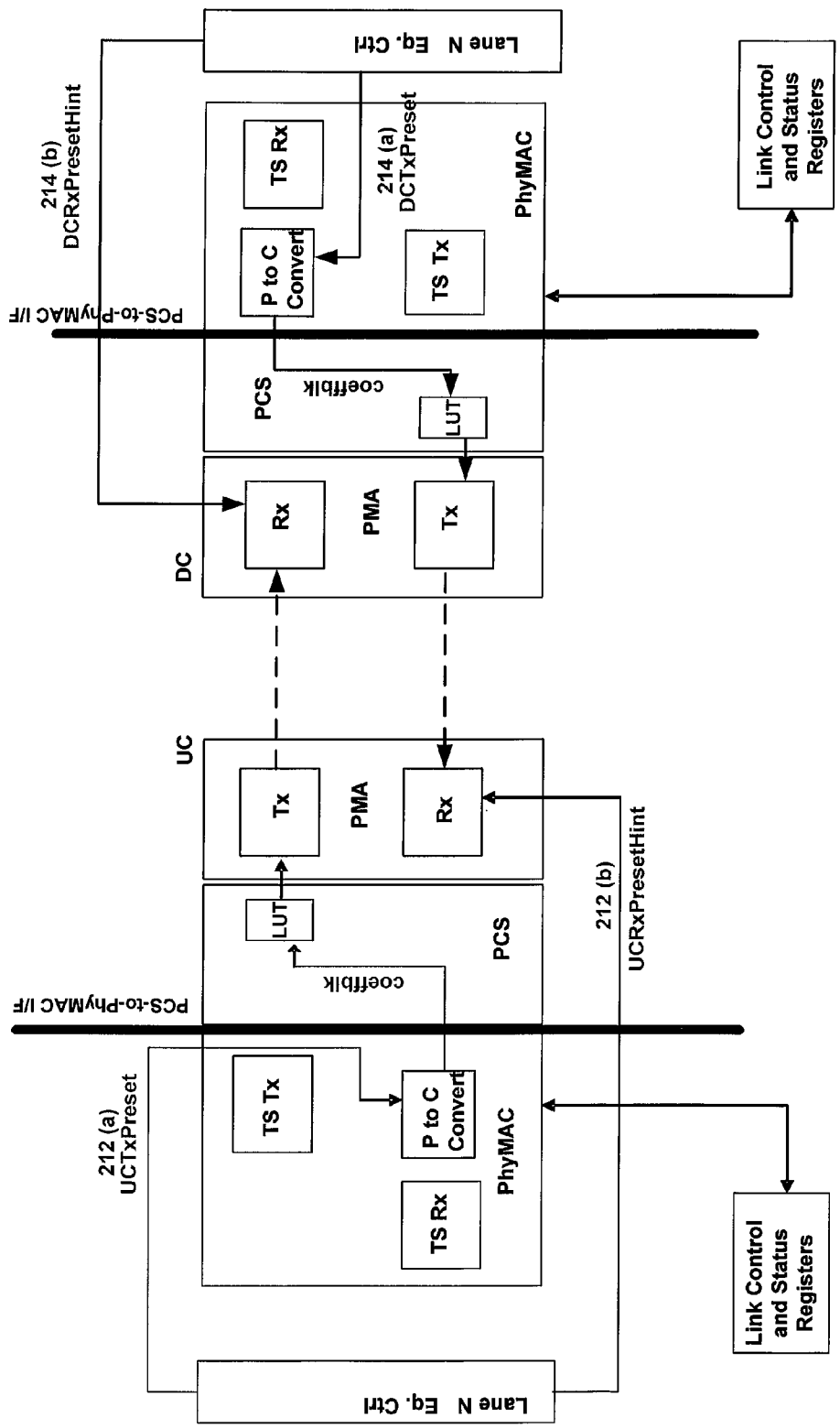
FIG. 4 depicts operations performed to apply the preset equalization settings in accordance with an embodiment of the invention.
Figure 5:
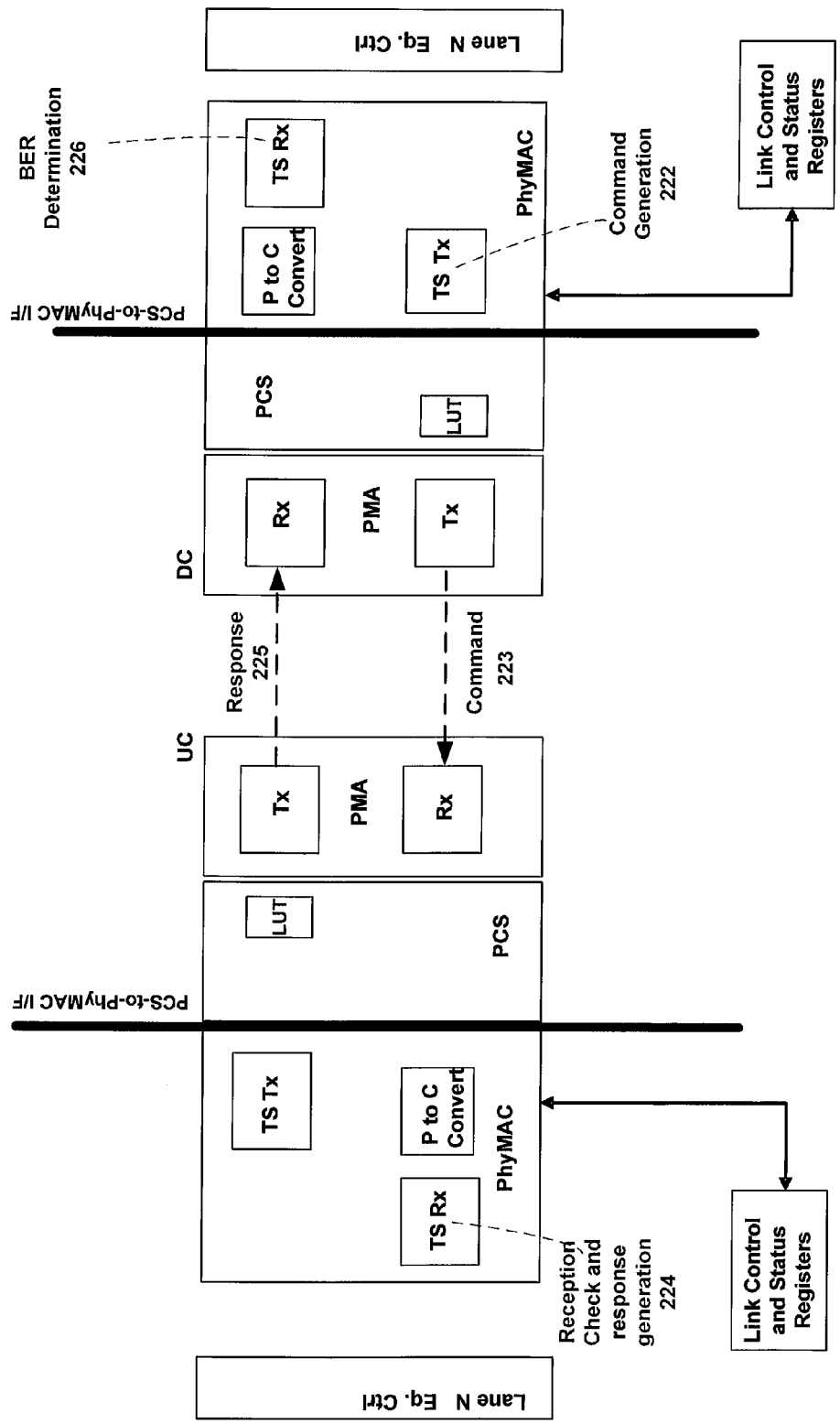
FIG. 5 depicts operations performed to refine coefficients by a downstream component in accordance with an embodiment of the invention.
Figure 6:
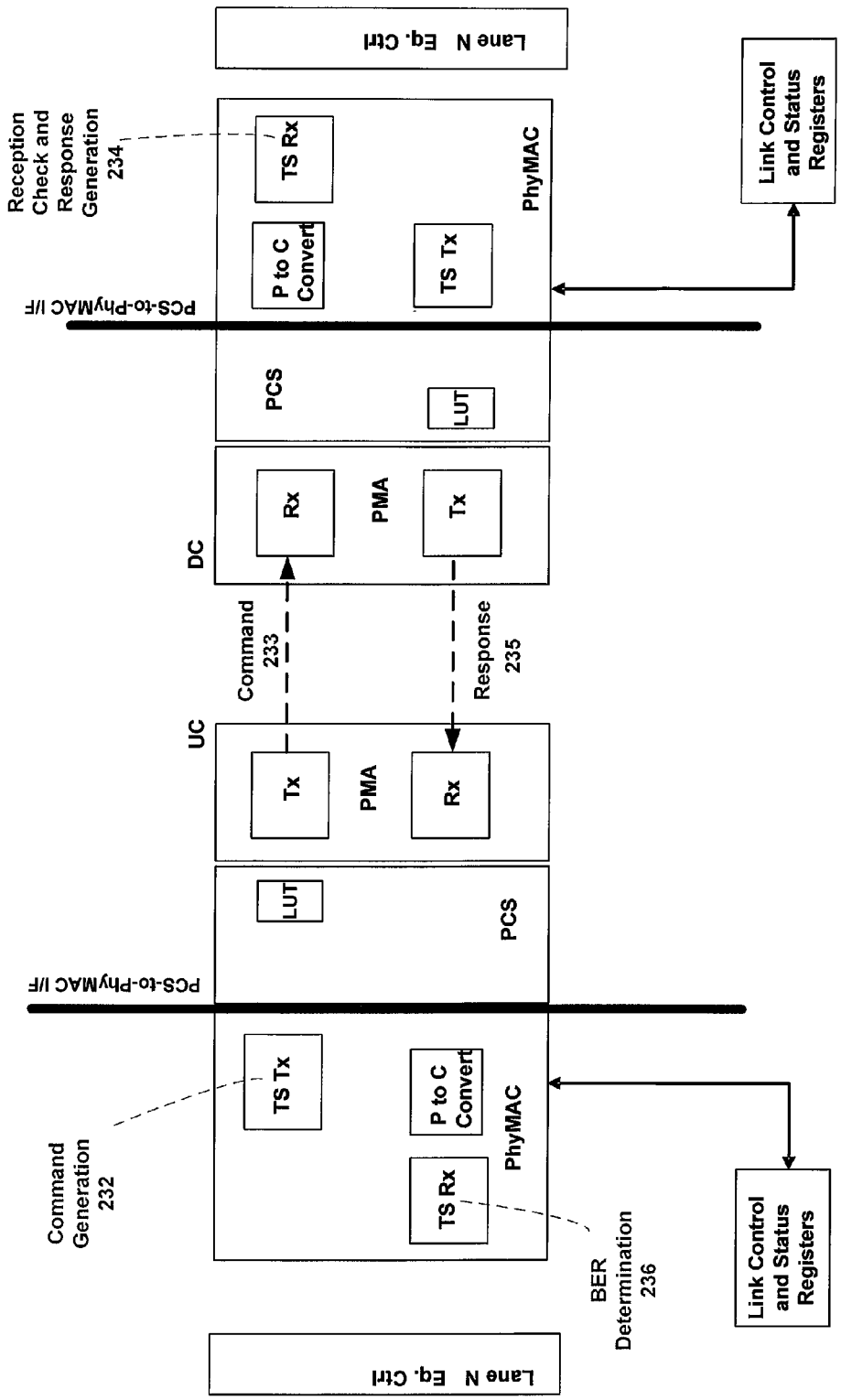
FIG. 6 depicts operations performed to refine coefficients by an upstream component in accordance with an embodiment of the invention.

FIG. 2 is an exemplary flow chart showing a method 200 of dynamic transmit equalization in accordance with an embodiment of the invention. As shown in FIG. 2, the method 200 may include four phases (Phase 0, Phase 1, Phase 2, and Phase 3). FIGS. 3-6 depict one embodiment of device circuits configured to perform the method 200 of FIG. 2. FIG. 3 depicts operations performed in Phase 0. FIG. 4 depicts operations performed in Phase 1. FIG. 5 depicts operations performed in Phase 2. Lastly, FIG. 6 depicts operations performed in Phase 3. Phases 0 and 1 may be considered together as an initial phase.

As seen in FIGS. 3-6, a "link" may be formed between two communication devices. A link may include multiple (i.e. "N") lanes, each lane incorporating a transceiver. One communication device may be configured as an upstream component (UC), and the other communication device may be configured as a downstream component (DC). Each of the UC and DC may include various circuitry, such as physical media attachment (PMA) circuitry, physical coding sublayer (PCS) circuitry, physical layer and media access control layer (PhyMAC) circuitry, and control circuitry and registers. The control circuitry and registers may include an equalization controller for the lane (Lane N Eq. Ctrl) and link control and status registers. According to one embodiment, the PCS circuitry shown is per lane, and the PhyMAC circuitry shown is partially per lane and partially aggregated (i.e. per link). The equalization interface shown is per lane.

Referring to FIG. 2, the method 200 begins in Phase 0. In Phase 0, preset (default) equalization-related settings are obtained. Per block 202, the upstream component (UC) obtains the UC preset data. The UC preset data may be obtained from firmware at the UC by the equalization controller. In particular, the UC preset data may include UC transmitter preset data (UCTxPreset in FIG. 3) and UC receiver preset hint data (UCRxPresetHint in FIG. 3). As described further below, the UC preset data are to be used initially by the UC for equalization of transmitted and received signals at a high speed, such as, for example, 8 gigahertz (GHz) or more.

Meanwhile, per block 204 in Phase 0, the UC obtains the DC preset data and transmits it to the DC. The DC preset data may be obtained from firmware at the UC by the equalization controller. In particular, the DC preset data may include DC transmitter preset data (DCTxPreset in FIG. 3) and DC receiver preset hint data (DCRxPresetHint in FIG. 3). The DC preset data may be sent, for example, by the training sequence transmitter (TS Tx) in the PhyMAC circuitry via a low-speed datapath at the UC. For example, the low-speed datapath may use 8B/10B encoding and may have a speed of 2.5 GHz or 5 GHz. Per block 206, the DC receives the DC preset data. The DC preset data may be received, for example, by the training sequence receiver (TS Rx) in the PhyMAC circuitry via the low-speed datapath at the DC.

Per block 208, the equalization controller at the DC may obtain and store the DC preset data. As described further below, the DC preset data (including the DCTxPreset and DCRxPresetHint discussed above) are to be used initially by the DC for equalization of transmitted and received signals at the high speed.

After Phase 0, the method 200 may go on to Phase 1. The Phase 1 operations are depicted in FIG. 4. In Phase 1, the preset data are applied at the UC and the DC.

Per block 212 of Phase 1, the UC applies the UC TX preset coefficient data and UC RX preset hint data to derive transmitter and receiver coefficients, respectively, so that they may be used by the equalizers of the Tx and Rx circuits, respectively, within the PMA of the UC. As shown in FIG. 4, the UC TX preset data (UCTxPreset) may be sent from the equalization controller (Lane N Eq. Ctrl) to a preset-to-coefficient converter (P-to-C Convert) circuit in the PhyMAC circuitry. The P-to-C Convert circuit converts the UC TX preset data to a coefficient data signal that may be sent via an interface (PCS-to-PhyMAC I/F) to the PCS circuitry. One implementation of the coefficient data signal is described below in relation to FIG. 7. A look-up table (LUT) in the PCS circuitry may be utilized to translate the coefficient data signal to analog coefficient levels that are specific to the transmitter (Tx) circuit in the PMA circuitry. Similarly, the UC RX preset hint data (UCRxPresetHint) may be sent from the equalization controller and applied by the receiver (Rx) circuit of the PMA circuitry.

Meanwhile, per block 214 of Phase 1, the DC applies the DC TX preset coefficients and RX preset hints to derive transmitter and receiver coefficients, respectively, so that they may be used by the equalizers of the Tx and Rx circuits, respectively, within the PMA of the DC during high speed operation. As shown in FIG. 4, the DC TX preset data (DCTxPreset) may be sent from the equalization controller (Lane N Eq. Ctrl) to a preset-to-coefficient converter (P-to-C Convert) circuit in the PhyMAC circuitry. The P-to-C Convert circuit converts the DC TX preset data to a coefficient data signal that may be sent via an interface (PCS-to-PhyMAC I/F) to the PCS circuitry. One implementation of the coefficient data signal is described below in relation to FIG. 7. A look-up table (LUT) in the PCS circuitry may be utilized to translate the coefficient data signal to analog coefficient levels that are specific to the transmitter (Tx) circuit in the PMA circuitry. Similarly, the DC RX preset hint data (DCRxPresetHint) may be sent from the equalization controller and applied by the receiver (Rx) circuit of the PMA circuitry.

After Phase 1 is completed, the method 200 may go on to Phase 2. The Phase 2 operations are depicted in FIG. 5. In Phase 2, the DC functions as a master device and the UC functions as a slave device. Refinement of the DC transmitter coefficients and UC receiver coefficients for high-speed operation is performed during Phase 2.

Per block 222 of Phase 2, commands may be generated by the TS Tx circuit in the PhyMAC circuitry of the DC. Subsequently, per block 223, the TS Tx circuit may cause transmission of the commands from the Tx circuit in the PMA circuitry of the DC to the Rx circuit in the PMA circuitry of the UC. In one implementation, the commands may be embedded in TS1 packets transmitted from the DC.

Per block 224, the TS Rx circuit in the PhyMAC circuitry of the UC may check the reception of the commands to determine if they were received without or with a bit error. Based on this, acknowledgement (ack) or no acknowledgement (nak) responses may be generated by the TS Rx circuit. Subsequently, per block 225, the responses may be transmitted from the Tx circuit in the PMA circuitry of the UC to the Rx circuit in the PMA circuitry of the DC. In one implementation, the responses may be embedded in PCI Express® TS1 packets transmitted from the UC.

Per block 226, the TS Rx circuit at the DC may then determine a bit error rate (BER) based on the responses received. Per block 227, the TS Rx circuit at the DC may then check as to whether or not the BER is sufficiently low to pass below a threshold error rate. For example, the threshold error rate may be $10^{-12}$.

If the BER does not pass below the threshold error rate, then the method 200 may perform block 228 in which the UC TX coefficient data and the DC RX coefficient data are adjusted (refined) in order to achieve a more optimal eye opening at the receiver. Thereafter, the method 200 loops back to block 222 and performs the command/response sequence so that the BER may again be checked. In one implementation, the DC may be allowed a limited time period to refine the UC TX and DC RX coefficient data. For example, the limited time period may be 24 milliseconds.

On the other hand, if the BER does pass below the threshold error rate, then Phase 2 is completed, and Phase 3 may begin. The Phase 3 operations are depicted in FIG. 6. In Phase 3, the UC functions as a master device and the DC functions as a slave device. Refinement of the UC transmitter coefficients and DC receiver coefficients for high-speed operation is performed during Phase 3.

Per block 232 of Phase 3, commands may be generated by the TS Tx circuit in the PhyMAC circuitry of the UC. Subsequently, per block 233, the TS Tx circuit may cause transmission of the commands from the Tx circuit in the PMA circuitry of the UC to the Rx circuit in the PMA circuitry of the DC. In one implementation, the commands may be embedded in TS1 packets transmitted from the UC.

Per block 234, the TS Rx circuit in the PhyMAC circuitry of the DC may check the reception of the commands to determine if they were received without or with a bit error. Based on this, acknowledgement (ack) or no acknowledgement (nak) responses may be generated by the TS Rx circuit. Subsequently, per block 235, the responses may be transmitted from the Tx circuit in the PMA circuitry of the DC to the Rx circuit in the PMA circuitry of the UC. In one implementation, the responses may be embedded in PCI Express® TS1 packets transmitted from the DC.

Per block 236, the TS Rx circuit at the UC may then determine a bit error rate (BER) based on the responses received. Per block 237, the TS Rx circuit at the UC may then check as to whether or not the BER is sufficiently low to pass below a threshold error rate. For example, the threshold error rate may be $10^{-12}$.

If the BER does not pass below the threshold error rate, then the method 200 may perform block 238 in which the DC TX coefficient data and the UC RX coefficient data are adjusted (refined) in order to achieve a more optimal eye opening at the receiver. Thereafter, the method 200 loops back to block 232 and performs the command/response sequence so that the BER may again be checked. In one implementation, the UC may be allowed a limited time period to refine the DC TX and UC RX coefficient data. For example, the limited time period may be 24 milliseconds.

Once the BER passes below the threshold error rate, then the equalization for the bi-directional lane is complete per block 240. Thereafter, the lane may be used to transmit data bi-directionally at the high speed.

Figure 7:
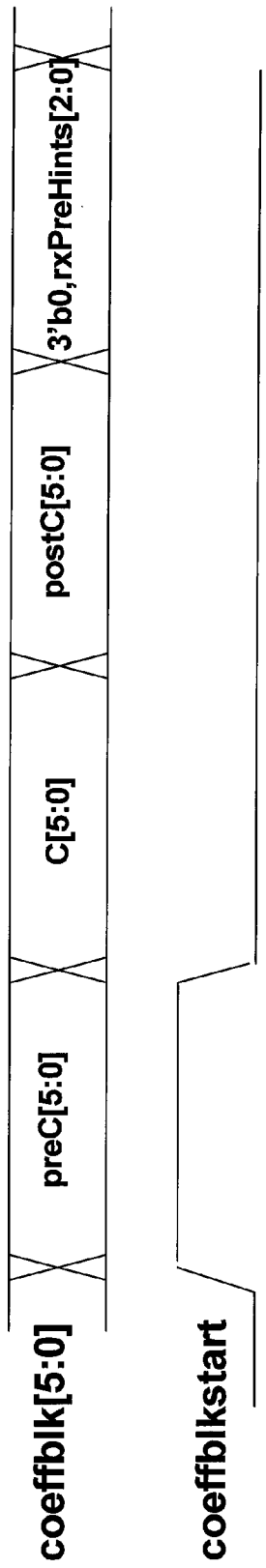
FIG. 7 is an exemplary timing diagram for coefficient signaling at the PCS-to-PhyMAC interface in accordance with an embodiment of the invention.

FIG. 7 is an exemplary timing diagram for coefficient signaling at the PCS-to-PhyMAC interface in accordance with an embodiment of the invention. As shown, in one implementation, the interface may include seven signal lines per lane at the PCS-to-PhyMAC interface. Six of the signal lines, coeffblk [5:0], may be used to transmit coefficient data blocks, and one signal line, coeffblkstart, may be asserted to indicate the start of a coefficient block.

Each coefficient data block may transport various types of equalization-related data in a time-multiplexed manner. For example, as shown in FIG. 7, a coefficient data block may include: TX precursor data (preC[5:0]); followed by TX cursor data (C[5:0]); followed by TX post-cursor data (postC[5:0]), followed by equalizer coefficient b0 and RX preset hint data (3'b0, rxPreHints[2:0]). Multiple coefficient data blocks may be used to transport the equalization-related data.

Figure 8:
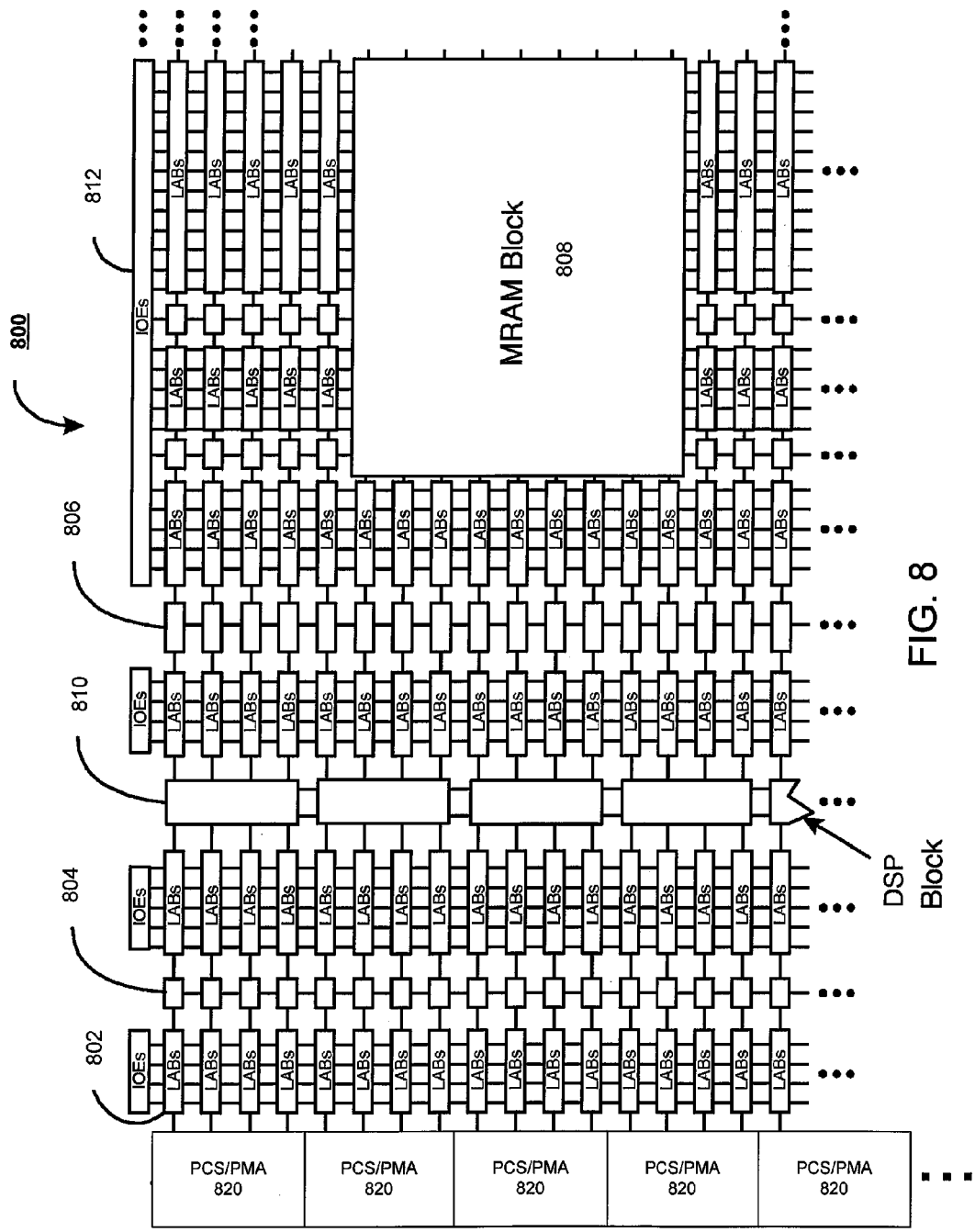
FIG. 8 is an exemplary simplified partial block diagram of a field programmable gate array (FPGA) that may be configured to implement an embodiment of the present invention.

FIG. 8 is an exemplary simplified partial block diagram of a field programmable gate array (FPGA) 800 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs). FPGA 800 includes within its "core" a two-dimensional array of programmable logic array blocks (or LABs) 802 that are interconnected by a network of column and row interconnect conductors of varying length and speed. LABs 802 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 800 may also include a distributed memory structure including random access memory (RAM) blocks of varying sizes provided throughout the array. The RAM blocks include, for example, blocks 804, blocks 806, and block 808. These memory blocks can also include shift registers and FIFO buffers.

FPGA 800 may further include digital signal processing (DSP) blocks 810 that can implement, for example, multipliers with add or subtract features. Input/output elements (IOEs) 812 located, in this example, around the periphery of the chip support numerous single-ended and differential input/output standards. Each IOE 812 is coupled to an external terminal (i.e., a pin) of FPGA 800.

An array of PMA and PCS circuitry 820 may be included as shown, for example. The PCS circuitry generally provides digital logic functions which implement data communication protocols, while the PMA circuitry generally provides mixed (analog/digital) signal functionality for the data communications. For example, for certain protocols, the PCS circuitry may be configured to perform, among other functions, 8 bit-to-10 bit and/or 128 bit-to-130 bit encoding for data to be sent to the PMA circuitry and 10 bit-to-8 bit and/or 130 bit-to-128 bit decoding for data received from the PMA circuitry. The PMA circuitry may be configured to perform, among other functions, serialization of data to be transmitted (conversion from parallel to serial) and de-serialization of received data (conversion from serial to parallel).

A subset of the LABs 802 coupled to modules in the PMA/PCS array 820 may be configured to implement the PhyMAC circuitry and the equalization and link control circuitry described above. Alternatively, the PhyMAC circuitry and the equalization and link control circuitry may be implemented as hardwired circuitry, or part configured LABs 802 and part hardwired circuitry.

It is to be understood that FPGA 800 is described herein for illustrative purposes only and that the present invention can be implemented in many different types of PLDs, FPGAs, and ASICs.

Figure 9:
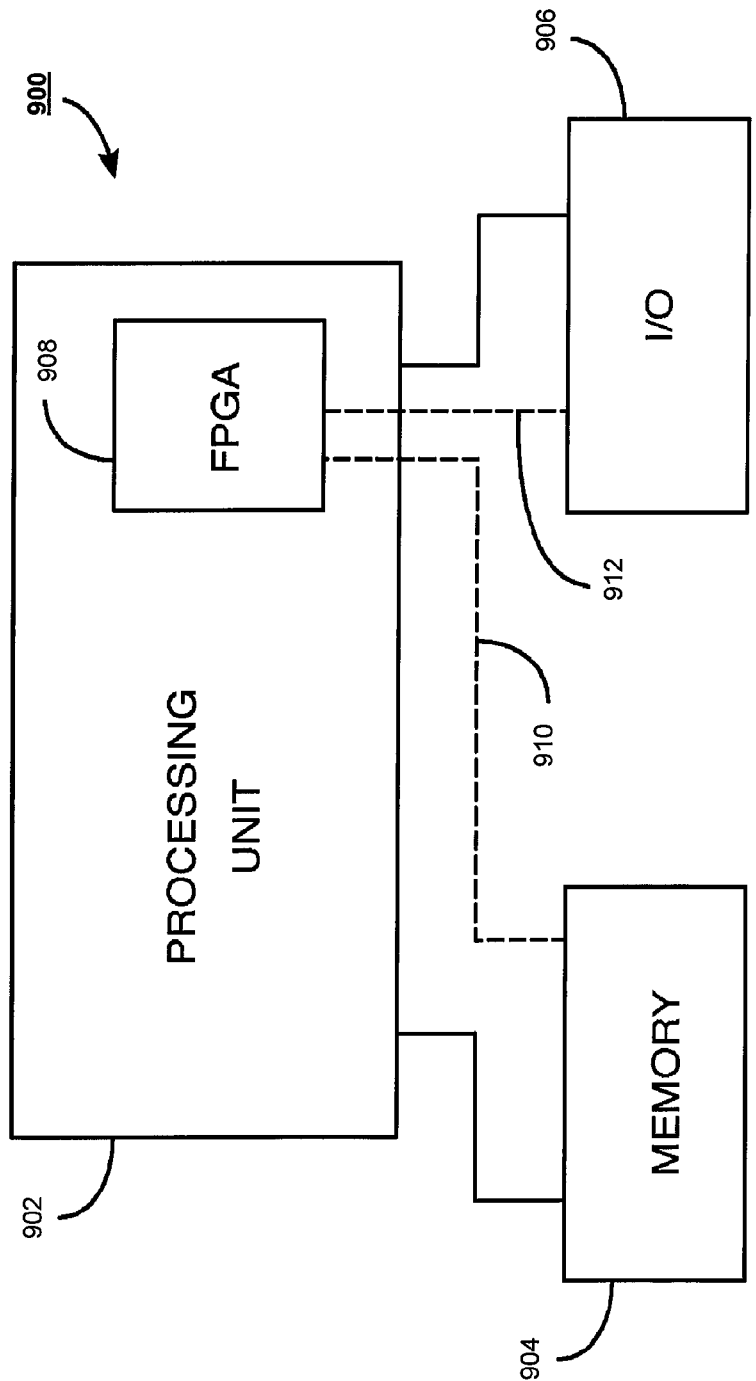
FIG. 9 shows a block diagram of an exemplary digital system that may be configured to utilize an embodiment of the present invention.

The present invention can also be implemented in a system that has a FPGA as one of several components. FIG. 9 shows a block diagram of an exemplary digital system 900 that can embody techniques of the present invention. System 900 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 900 may be provided on a single board, on multiple boards, or within multiple enclosures.

System 900 includes a processing unit 902, a memory unit 904, and an input/output (I/O) unit 906 interconnected together by one or more buses. According to this exemplary embodiment, FPGA 908 is embedded in processing unit 902. FPGA 908 can serve many different purposes within the system 900. FPGA 908 can, for example, be a logical building block of processing unit 902, supporting its internal and external operations. FPGA 908 is programmed to implement the logical functions necessary to carry on its particular role in system operation. FPGA 908 can be specially coupled to memory 904 through connection 910 and to I/O unit 906 through connection 912.

Processing unit 902 may direct data to an appropriate system component for processing or storage, execute a program stored in memory 904, receive and transmit data via I/O unit 906, or other similar function. Processing unit 902 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 908 may control the logical operations of the system. As another example, FPGA 908 acts as a reconfigurable processor that may be reprogrammed as needed to handle a particular computing task. Alternately, FPGA 908 may itself include an embedded microprocessor. Memory unit 904 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit comprising:
   physical coding sublayer (PCS) circuitry configured to encode data bytes for transmission and decode received data bytes;
   physical layer and media access control (PhyMAC) circuitry configured to control link initialization and training;
   an interface between the PCS circuitry and the PhyMAC circuitry;
   an equalization control circuit, external to the PCS circuitry, wherein the equalization control circuit is operable to perform dynamic transmit equalization using preset data using said interface between the PCS circuitry and the PhyMAC circuitry; and
   a preset-to-coefficient converter in the PhyMAC circuitry which is configured to convert transmitter preset data to transmitter coefficient data.

2. The integrated circuit of claim 1, wherein the equalization control circuit is operable to apply preset data for equalization in an upstream component, and wherein the equalization control circuit is operable to transmit the preset data to a downstream component for application therein.

3. The integrated circuit of claim 1, wherein the equalization control circuit is operable to refine receiver coefficients at an upstream component.

4. The integrated circuit of claim 1, wherein the equalization control circuit is operable to refine transmitter coefficients at an upstream component.

5. The integrated circuit of claim 1, wherein the integrated circuit comprises an upstream component, and wherein the upstream component is operable to receive commands transmitted from a downstream component, check reception of the commands, generate acknowledgment or no acknowledgement responses based on the reception, and transmit the responses to the downstream component.

6. The integrated circuit of claim 1, wherein the integrated circuit comprises an upstream component, and wherein the upstream component is operable to generate and transmit commands to a downstream component, receive acknowledgment or no acknowledgement responses from the downstream component, and determine a bit error rate based on the responses.

7. The integrated circuit of claim 1, wherein the integrated circuit comprises a downstream component, and wherein the downstream component is operable to generate and transmit commands to an upstream component, receive acknowledgment or no acknowledgement responses from the upstream component, and determine a bit error rate based on the responses.

8. The integrated circuit of claim 1, wherein the integrated circuit comprises a downstream component, and wherein the downstream component is operable to receive commands transmitted from an upstream component to the downstream component, check reception of the commands and generate acknowledgment or no acknowledgement responses based on the reception, and transmit the responses to the upstream component.

9. The integrated circuit of claim 1, further comprising:
a training sequence transmitter in the PhyMAC circuitry which is configured to cause transmission of commands to a training sequence receiver in another integrated circuit.

10. The integrated circuit of claim 1, further comprising:
a training sequence receiver in the PhyMAC circuitry which is configured to receive responses from a training sequence transmitter in another integrated circuit, wherein the training sequence receiver is operable to determine a bit error rate based on the responses.

11. The integrated circuit of claim 1, wherein the preset-to-coefficient converter is operable to output the transmitter coefficient data using said interface to the PCS circuitry.

12. The integrated circuit of claim 11, further comprising:
a look-up-table in the PCS circuitry which is configured to translate the transmitter coefficient data to analog coefficient levels.

13. The integrated circuit of claim 1, wherein the integrated circuit comprises a field programmable gate array.

14. The integrated circuit of claim 1, wherein the equalization control circuit and the PhyMAC circuitry comprise programmable logic which is configured to perform the dynamic transmit equalization using said interface between the PCS circuitry and the PhyMAC circuitry.

15. A method of dynamic transmit equalization, the method comprising:
encoding data bytes for transmission and decode received data bytes using physical coding sublayer (PCS) circuitry;
controlling link initialization and training using physical layer and media access control (PhyMAC) circuitry;
performing dynamic transmit equalization using preset data by an equalization control circuit external to the PCS circuitry using an interface between the PCS circuitry and the PhyMAC circuitry;
applying default settings for equalization in an upstream component using a preset-to-coefficient converter in the PhyMAC circuitry to convert transmitter preset data to transmitter coefficient data;
transmitting said default settings for equalization to a downstream component for application therein;
refining receiver coefficients at the upstream component; and
refining transmitter coefficients at the upstream component.

16. The method of claim 15, further comprising:
receiving commands transmitted from the downstream component to the upstream component;
checking reception of the commands and generating acknowledgment or no acknowledgement responses based on the reception; and
transmitting the responses to the downstream component.

17. The method of claim 16, wherein the refining of transmitter coefficients at the upstream component comprises:
generating and transmitting commands to the downstream component;
receiving acknowledgment or no acknowledgement responses from the downstream component; and
determining a bit error rate based on the responses.

18. The method of claim 15 further comprising:
receiving default settings for equalization from an upstream component;
applying the default settings for equalization in the downstream component;
refining transmitter coefficients at the downstream component; and
refining receiver coefficients at the downstream component.

19. The method of claim 18, further comprising:
generating and transmitting commands to an upstream component;
receiving acknowledgment or no acknowledgement responses from the upstream component; and
determining a bit error rate based on the responses.

20. The method of claim 18, further comprising:
receiving commands transmitted from the upstream component to the downstream component;
checking reception of the commands and generating acknowledgment or no acknowledgement responses based on the reception; and
transmitting the responses to the upstream component.

21. A transceiver circuit with dynamic transmit equalization, the transceiver circuit comprising:
physical coding sublayer (PCS) circuitry;
physical layer and media access control (PhyMAC) circuitry;
a preset-to-coefficient converter in the PhyMAC circuitry which is configured to convert transmitter preset data to transmitter coefficient data;
an interface between the PCS circuitry and the circuitry; and
an equalization controller which is external to the PCS circuitry and which is configured to perform dynamic transmit equalization using preset data using said interface,
wherein the interface is configured to provide transmit coefficient data in a time-multiplexed signal format from the PhyMAC circuitry to the PCS circuitry.

22. The transceiver circuit of claim 21, wherein the PhyMAC circuitry comprises:
a training sequence transmitter configured to cause transmission of commands to a training sequence receiver in another transceiver circuit; and
a training sequence receiver configured to receive responses from a training sequence receiver in the another transceiver circuit and to determine a bit error rate based on the responses.

23. The transceiver circuit of claim 21, wherein the equalization controller comprises programmable logic configured to perform dynamic transmit equalization using said interface between the PCS circuitry and the PhyMAC circuitry.

24. The transceiver circuit of claim 21, wherein the PhyMAC circuitry comprises programmable logic configured to cause transmission of commands to a training sequence receiver in another transceiver circuit, receive responses from the training sequence receiver in the other transceiver circuit, and determine a bit error rate based on the responses.

* * * * *